(No Model.)
J. K. INGALLS.
ILLUMINATING TILE.
No. 258,232. Patented May 23, 1882.
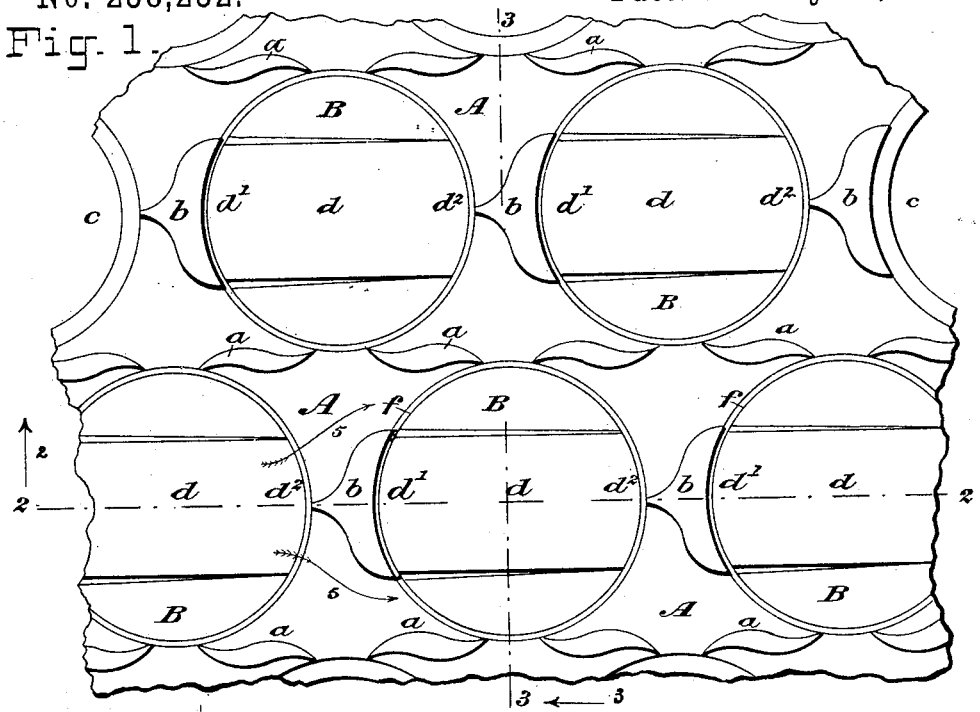
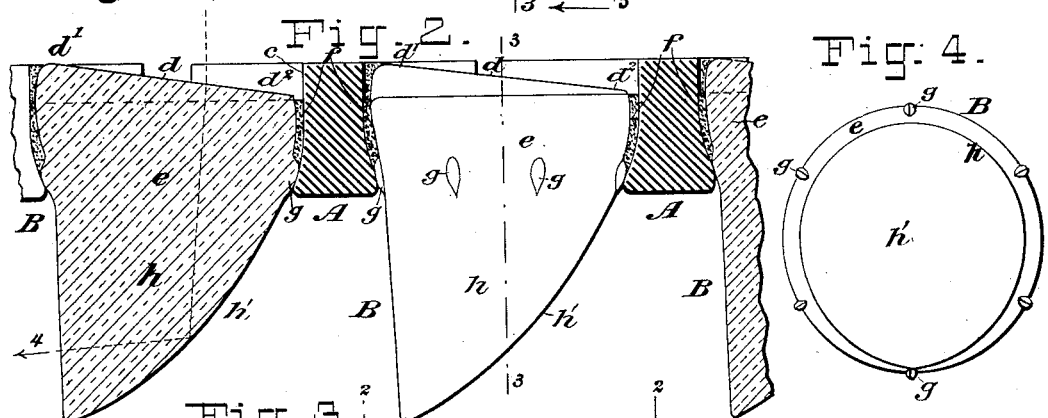
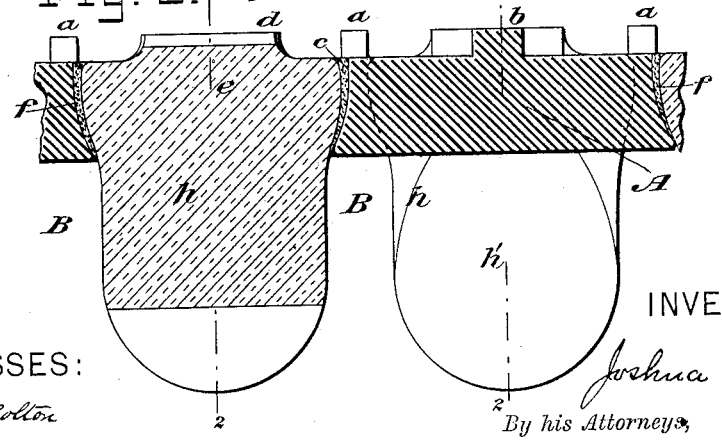
WITNESSES:
E. B. Bolton
Geo. Bainton
INVENTOR:
Joshua K. Ingalls
By his Attorneys,
Burke Fraser & Connett

UNITED STATES PATENT OFFICE.

JOSHUA K. INGALLS, OF NEW YORK, N. Y.

ILLUMINATING-TILE.

SPECIFICATION forming part of Letters Patent No. 258,232, dated May 23, 1882.

Application filed January 12, 1882. (No model.)

*To all whom it may concern:*

Be it known that I, JOSHUA K. INGALLS, a citizen of the United States, residing at the city, county, and State of New York, have invented certain Improvements in Illuminating-Tiles, of which the following is a specification.

This invention relates in part to the construction and setting of the illuminating-lenses and in part to the metallic frame or plate in which said lenses are set, the objects being in part to prevent the pendent lenses from being broken by unequal expansion, in part to prevent the exposed surface of the lens from being dimmed by collections of dirt thereon, in part to enable the lenses to be set evenly and firmly in their sockets, and in part to provide for the better transmission of the light by reflection and refraction into the rooms below the sidewalk or the roof in which the lenses are placed.

The novel features of the invention will be fully set forth, and defined in the claims.

In the drawings, which serve to illustrate my invention, Figure 1 is a fragmentary plan of an illuminating-tile embodying my improvements. Fig. 2 is a vertical section of the same on the line 2 2 in Fig. 1, looking in the direction indicated by arrow 2. Fig. 3 is a vertical section on the line 3 3 in Figs. 1 and 2, looking in the direction indicated by arrow 3; and Fig. 4 is an under side plan view of one of the lenses detached.

Let A represent the socket-plate, generally made from cast metal, and B the lenses, set in sockets therein, in alternate order by preference. The plate has elevations or studs $a$ $a$ and $b$ $b$ formed on its upper face, which perform several important functions that will be referred to more particularly hereinafter, and has sockets or apertures $c$ $c$ formed in it to receive the lenses. These sockets are slightly spheroidal in form, and the opening at the upper side of the plate is a little larger than that at the lower side, whereby the lenses are properly supported and prevented from falling through. The lens—preferably circular in plan, but not necessarily so—has several peculiarities of construction. On its upper face, occupying about one-half its width by preference, is formed an inclined plane, $d$, the end $d'$ of which is elevated about as high above the general level of the top of the lens as the studs $a$ and $b$ rise above the general level of the plate A. This plane runs down to the general level of the top of the lens at its other end, $d^2$. The portion $e$ of the lens, which rests in the socket $c$, is made slightly spheroidal, to conform nearly to the shape of the socket, being a little smaller than the same, to make room for the cement $f$ employed in setting the lenses. On this part of the lens are formed several thin projecting ribs, $g$ $g$. (Seen best in Fig. 4.) The roughness and irregularity of the sockets, due to unequal shrinkage in casting and to other causes, sometimes prevent the unyielding lenses from being properly set to the same uniform depth.

By providing the lenses with ribs $g$ $g$ so thin and fragile as to be crushed off by pressing the lenses into their sockets, I am enabled to bring all of the lenses down to the proper level before the cement is run in, as will be readily understood. The pendent portion $h$ of the lens is in the form of a cylindrical ungula, the oblique side $h'$ being an elliptic or parabolic curve by preference, as shown in Fig. 3. Where the horizontal section or the plan of the lens is not a circle this pendent portion would approach more nearly to the form of a prismatic ungula, as will be well understood. The vertical rays of light, which are the strongest, enter the lens through the inclined plane $d$, and, being refracted by the inclined surface, strike the curved or inclined anterior face, $h'$, at at angle more obtuse than would be the case if the plane $d$ were not inclined. From this face the rays are reflected back into the room, as indicated by the arrow 4 in Fig. 2.

It will be observed that the part $e$ of the lens is joined to the pendent part $h$ by a sweep or curve, and that all sharp or re-entering angles or shoulders are avoided. The object of this is to prevent the pendent portion from breaking off under the strain caused by unequal expansion and contraction. In winter, for example, the upper exposed part, $e$, will be cold, while the pendent part will be warm, owing to its protected interior position, and if a neck or shoulder were formed at the junction the lens would inevitably break at this point. By making the inferior portion of the lens merely a continuation of the superior portion, and avoiding abrupt offsets at their junction, I avoid all danger of breaking from this cause.

It will be observed, also, that I avoid the formation of a flanged lip on the lower interior face of the socket, such as is usually employed to take under a shoulder on the lens and support it. Such flanges, by interposing an opaque obstacle, cut off a large percentage of the light which would otherwise pass through the lens. The slight conical swell on the part e of the lens is sufficient to support it in the correspondingly-shaped socket, and such a construction offers very little, if any, impediment to the passage of the rays of light.

In setting the lenses I first place a little putty around the lower margin of the socket, and then set in the lens, grinding or crushing off the fragile ribs g in setting as much as may be necessary to properly bed the lens. When the lenses are thus set I then pour into the spaces around them the usual molten cement or other good cementing material. The rounding off of the upper angle of the spheroidal portion e of the lens also enables me to flow the cement over said edge, as shown in Fig. 3, which serves to keep the lens down in its socket.

I will now describe the construction, arrangement, and purpose of the studs or elevations a and b on the plate. One function of these is to prevent the slipping of the feet in walking, as is well known. Another is to strengthen the plate. By arranging the studs a a at the points where the sockets are nearest together, and extending them from socket to socket, the plate is strengthened at its weakest points, as is known. The elevations b are made pointed, and are arranged at the elevated ends d' of the inclined planes d of the lenses. The broader ends of the elevations b being as wide as the planes d, and they having their pointed ends in the opposite direction or away from the planes, it will be seen that the soiled water will flow down the planes, and the current be divided, as indicated by arrows 5 in Fig. 1, and flow on at each side of the planes, thus keeping the latter clean. In sweeping, also, the points of the elevations b will prevent any collection of dirt at the elevated ends of the planes d, and will also secure them against injury from blows. The passages between the elevated planes d and the studs a, which are in line, are unobstructed for the entire length of the tile.

As before stated, I do not limit myself to a lens which is circular in plan; and, although I prefer to curve the oblique side of the pendent portion h, I do not limit myself to this. I may make the same an oblique plane. The other side of the pendent portion stands in a vertical plane, or nearly so.

Having thus described my invention, I claim—

1. A lens for an illuminating-tile, having a slightly-spheroidal upper portion to rest in a correspondingly-shaped socket, and a pendent portion united to the upper portion by a long sweep or curve, whereby the formation of a neck or abrupt angle is avoided, and an underlying flange or lip on the socket is rendered unnecessary, substantially as set forth.

2. A lens for an illuminating-tile, having slender ribs formed exteriorly on the portion of the lens which rests in the socket, whereby the said lenses may be the better adjusted to a uniform level, as set forth.

3. A lens for an illuminating-tile, having a pendent portion, one side of which stands nearly vertical and the other face inclined, said pendent portion having substantially the form of an ungula, as set forth and shown.

4. A lens for an illuminating-tile, having a portion of its upper exterior face made into the form of an inclined plane, substantially as and for the purposes set forth.

5. A lens for an illuminating-tile, having a conical portion to rest in the socket in the socket-plate, and a pendent portion having a vertical face and a curved, oblique, or inclined face, substantially as and for the purposes set forth.

6. A lens for an illuminating-tile, having a conical portion, e, provided with ribs g and an inclined plane, d, and a pendent portion, h, having the form of an ungula, substantially as herein set forth.

7. The combination of a lens having an inclined plane formed on a portion of its upper face only, and said plane being arranged obliquely to the vertical axis of the lens, with a socket-plate having the axes of its lens-sockets arranged at right angles to the general level of the plate, and provided with an elevation or stud arranged at the end of the inclined plane on the lens, substantially as and for the purposes set forth.

8. The combination, with the socket-plate provided with studs a a and pointed elevations b b, arranged as shown, of the lenses B, provided with inclined planes d and pendent ungulas h, all arranged substantially as set forth.

In witness whereof I have hereunto signed my name in the presence of two subscribing witnesses.

JOSHUA K. INGALLS.

Witnesses:
HENRY CONNETT,
ARTHUR C. FRASER.